July 6, 1948.　　　G. W. BORKLAND　　　2,444,420
DRAWING AND TEMPERING PLASTIC MATERIAL
Filed Dec. 23, 1944
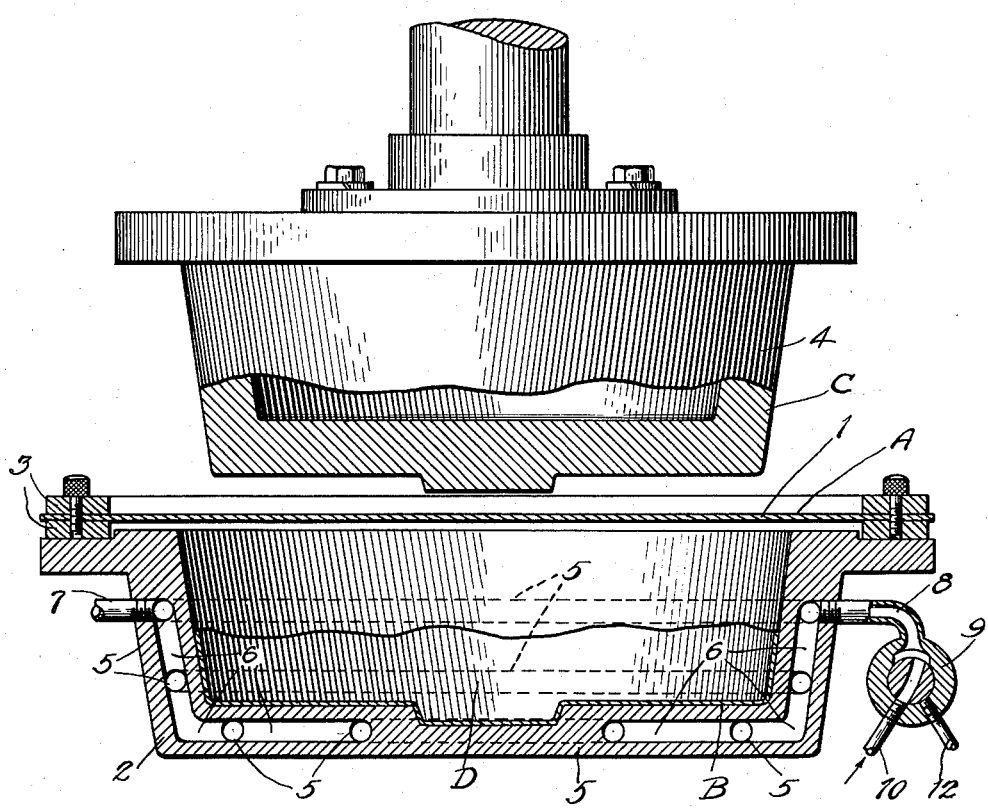

Patented July 6, 1948

2,444,420

UNITED STATES PATENT OFFICE 2,444,420

DRAWING AND TEMPERING PLASTIC MATERIAL

Gustave W. Borkland, Marion, Ind.

Application December 23, 1944, Serial No. 569,526

5 Claims. (Cl. 18—56)

My invention relates to drawing sheet plastic material.

One of the objects of my invention is to provide a method and apparatus for drawing sheet plastic material by means of which a relatively deep draw may be made and in which the back-stretch and cold flow will be minimized. In my Patent No. 2,357,806 is disclosed a method of drawing sheet plastic material. In using this method, care must be exercised to avoid heating the sheet of plastic material to a temperature such as would lessen its tensile strength to an extent which would cause fracture in the drawing operation. In using this method, it was found that under certain conditions there was a tendency of the material to retract towards its original shape when the forming pressure was removed.

One of the objects of my invention is to prevent or lessen this retractile action.

Numerous other objects and advantages of the invention will be apparent from the description and claims.

In the drawings, in which my invention is illustrated, the figure is a vertical sectional view showing the forming apparatus.

In carrying out the method, a sheet of plastic material is mounted in a frame and is heated in any usual manner to a point at which the sheet is ductile but will not sag materially by gravity nor be fractured in the drawing operation. The material is then drawn into the desired shape by means of forming tools such, for example, as disclosed in my Patent No. 2,357,806. Before the forming tools are withdrawn to release the sheet, the sheet is heated to a higher temperature, which may be just below the melting point, to minimize or prevent the retractile action of the sheet, and the sheet is then quickly chilled to give the material a permanent set, the forming tool remaining in forming position until the sheet is chilled. The forming tool is then withdrawn to release the formed sheet.

If a sheet of vinyl chloride resin is heated to between 150° F. and 225° F., that is, to a point in which the sheet is ductile but will not sag materially by gravity, the material will stretch under pressure without fracture far beyond the stretch under pressure of cold material using the same pressure, or beyond that of material which has been heated above 225° F. If the material is heated over 225° F., thus lessening the tensile strength, the forming pressure exerted later will cause the material to fracture, due to the decrease in tensile strength. If, however, the material is heated to between 150° F. and 225° F., it is possible to draw the material into the ratio of depth to spread of approximately 1:1 or more. However, the back-stretch or retractile action of the material formed in this way will result in twenty to fifty per cent. less back-stretch or shrinkage, or loss in depth, depending upon the thickness of the material, the temperature at which it is formed, and the temperature at which the material is removed from the forming tool.

In order to avoid the back-stretch or shrinkage of the material toward the flat form, it is proposed that the sheet material I be stretched at a reduced temperature, such as 150° F.–225° F., then heated to a higher temperature just below the melting point (perhaps 250° F.–375° F.) and then quickly chilled, giving the material a permanent set and reducing the shrinkage to a minimum (perhaps two or three per cent.). This will also reduce the cold flow of the material. This process is applicable to rigid, semi-rigid, flexible, thermoplastic, and thermosetting synthetic plastics of some type. The heating and cooling may be accomplished by heating and cooling a forming die, or by direct application of a heating and cooling fluid to the plastic.

Some materials which can be used are vinyl acetate, synthetic rubber, flexible ethyl cellulose, and many highly plasticized plastics. With some materials I have found a period of around thirty seconds for the relaxing heat and around thirty seconds for the cooling gives satisfactory results. This, however, may vary with the thickness of the sheet material. However, the temperatures and time periods used in carrying out the process may vary with the materials used and with the shape of the finished product.

The preheating of the material is not sufficient to cause a fracture of the material when the male die comes in contact with the material, nor when the extreme pressure has been exerted on the preheated material. The preheated material is warm but not of a melting temperature and its tensile strength has not been reduced materially or sufficiently to cause it to fracture under pressure. Heat is then applied to the surface of the material to set the material after the forming die has been closed, and the material is then chilled, setting the material in the new form. Then, on removing it from the male portion of the die, the unit will not sag or shrink or return to its original shape.

An advantage of this method is that it permits the molding from sheet stock of deep drawn items without a return of any appreciable degree to its original shape.

The construction shown in the drawings comprises a concave forming tool 2, a clamping frame 3 in which is secured the sheet 1 of plastic material positionable to hold the sheet over the forming tool 2, and a convex forming tool 4 cooperating with the concave forming tool to engage and stretch the sheet from its original flat shape at A to the dished shape shown at B.

The concave forming tool is provided with a plurality of spaced fluid passages 5, herein shown as annular, for the passage of suitable heating and cooling mediums. These passages are interconnected, as shown at 6. A discharge passage 7 is provided for the discharge of the liquid from all of the interconnecting passages. A supply passage 8 is provided which communicates with the passages 5 and 6 and with a two-way valve 9 which, in one position, connects the supply passage 8 with a heating fluid or steam supply pipe 10 and, in another position, with a cooling fluid supply pipe 12.

In use, the sheet 1 of plastic material is clamped in the frame 3, the sheet being preheated to a temperature at which the sheet will be ductile but will not sag materially under its own weight and will not rupture in the drawing operation. The convex forming tool 4 is brought down, moving from the position shown at C to the position shown at D. No means need be provided for heating the convex forming die. In this drawing operation, the sheet is stretched from a flat form, shown at A, to the concave form shown at B.

If, now, the convex die were to be withdrawn, the dished plastic sheet would undergo a back-stretch or shrinkage or retractile stage, during which the product might be so distorted as to be unsatisfactory. In order to prevent this back-stretch, the shaped sheet is heated to a temperature considerably higher than the preheating temperature, as a result of which the material will undergo a relaxing or flow stage, and after this heating operation the sheet is quickly cooled, as a result of which heating and cooling operations the sheet is given a permanent set, and subsequent back-stretch and cold flow are prevented or greatly minimized. The final cooling should be such as to reduce the temperature of the plastic material to a point at least as low as the preheating temperature.

Further modifications will be apparent to those skilled in the art and it is desired, therefore, that the invention be limited only by the scope of the appended claims.

Having thus described my invention, what I claim and desire to secure by Letters Patent is:

1. A method of forming products from sheet thermoplastic annealable material having a plasticizing temperature at which it has a retractile tendency and having an annealing temperature higher than the plasticizing temperature at which it minimizes the retractile tendency, comprising heating the sheet to a pasticizing temperature lower than the annealing temperature, drawing the sheet while heated and plastic to depress portions thereof to increase the superficial area thereof, heating the still hot and plastic material to an annealing temperature while in its drawn tensioned condition, and then cooling the previously heated depressed portions to set them.

2. A method of forming products from sheet thermoplastic annealable material having a plasticizing temperature between 150° F. and 225° F. at which it has a retractile tendency a melting temperature between 250° F. and 375° F. and having an annealing temperature higher than the plasticizing temperature and lower than the melting temperature at which it minimizes the retractile tendency, comprising heating the sheet to a plasticizing temperature lower than the annealing temperature, drawing the sheet while heated and plastic to depress portions thereof to increase the superficial area thereof, heating the still hot and plastic material to an annealing temperature above the plasticizing temperature and below the melting temperature while in its drawn tensioned condition, and then cooling the previously heated depressed portions to set them.

3. A method of forming products from sheet thermoplastic annealable vinyl acetate having a plasticizing temperature at which it has a retractile tendency and having an annealing temperature higher than the plasticizing temperature at which it minimizes the retractile tendency, comprising heating the sheet to a plasticizing temperature lower than the annealing temperature, drawing the sheet while heated and plastic to depress portions thereof to increase the superficial area thereof, heating the still hot and plastic material to an annealing temperature while in its drawn tensioned condition, and then cooling the previously heated depressed portions to set them.

4. A method of forming products from sheet thermoplastic annealable synthetic rubber having a plasticizing temperature at which it has a retractile tendency and having an annealing temperature higher than the plasticizing temperature at which it minimizes the retractile tendency, comprising heating the sheet to a plasticizing temperature lower than the annealing temperature, drawing the sheet while heated and plastic to depress portions thereof to increase the superficial area thereof, heating the still hot and plastic material to an annealing temperature while in its drawn tensioned condition, and then cooling the previously heated depressed portions to set them.

5. A method of forming products from sheet thermoplastic annealable flexible ethyl cellulose having a plasticizing temperature at which it has a retractile tendency and having an annealing temperature higher than the plasticizing temperature at which it minimizes the retractile tendency, comprising heating the sheet to a plasticizing temperature lower than the annealing temperature, drawing the sheet while heated and plastic to depress portions thereof to increase the superficial area thereof, heating the still hot and plastic material to an annealing temperature while in its drawn tensioned condition, and then cooling the previously heated depressed portions to set them.

GUSTAVE W. BORKLAND.

REFERENCES CITED

The following references are of record in the file of this patent:

UNITED STATES PATENTS

| Number | Name | Date |
|---|---|---|
| 145,762 | Spooner | Dec. 23, 1873 |
| 669,331 | Thurber | Mar. 5, 1901 |
| 2,120,328 | Ferngren | June 14, 1938 |
| 2,217,451 | Patnode | Oct. 8, 1940 |
| 2,239,780 | Fikentscher | Apr. 29, 1941 |
| 2,230,189 | Ferngren | Jan. 28, 1941 |
| 2,285,967 | Hardy | June 9, 1942 |
| 2,342,378 | Smith | Feb. 22, 1944 |
| 2,362,672 | Sloan | Nov. 14, 1944 |